United States Patent
Kangas et al.

(10) Patent No.: US 8,605,959 B2
(45) Date of Patent: Dec. 10, 2013

(54) APPARATUS, SYSTEM, AND METHOD FOR SEQUENCED BIOMETRIC AUTHENTICATION

(75) Inventors: Dan Kangas, Raleigh, NC (US); Regina Dawn Kangas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 977 days.

(21) Appl. No.: 12/340,909

(22) Filed: Dec. 22, 2008

(65) Prior Publication Data

US 2010/0158327 A1  Jun. 24, 2010

(51) Int. Cl.
*G06K 9/00* (2006.01)

(52) U.S. Cl.
CPC .................... *G06K 9/0002* (2013.01)
USPC ....................................... 382/124

(58) Field of Classification Search
None
See application file for complete search history.

(56) References Cited

U.S. PATENT DOCUMENTS

| | | | |
|---|---|---|---|
| 6,757,410 B1 * | 6/2004 | Nakashima | 382/124 |
| 6,766,456 B1 | 7/2004 | McKeeth | |
| 6,963,659 B2 | 11/2005 | Tumey et al. | |
| 7,007,298 B1 | 2/2006 | Shinzaki et al. | |
| 2001/0036297 A1 * | 11/2001 | Ikegami et al. | 382/115 |
| 2005/0129289 A1 | 6/2005 | Birchbauer et al. | |
| 2006/0026536 A1 * | 2/2006 | Hotelling et al. | 715/863 |
| 2007/0030963 A1 * | 2/2007 | Wyld et al. | 380/44 |

FOREIGN PATENT DOCUMENTS

| | | |
|---|---|---|
| FR | 2850478 A1 | 7/2004 |
| JP | 10154231 A | 6/1998 |
| JP | 2003256377 A | 9/2003 |
| KR | 20030008891 A | 1/2003 |

* cited by examiner

*Primary Examiner* — Kimyen Vu
*Assistant Examiner* — Fred Hu
(74) *Attorney, Agent, or Firm* — Kunzler Law Group

(57) ABSTRACT

An apparatus, system, and method are disclosed for multi-factor authentication using a biometric scanner. The apparatus includes an input module that receives a biometric scan and a verification sequence that are entered by a user using a biometric reader. The verification sequence may be a fingerprint scanned at multiple angles, or can be a series of symbols entered using the biometric scanner. A matching module compares the biometric scan with authenticated biometric scans stored in a data store and determines whether or not there is a matching authenticated biometric scan. The matching module also compares the verification sequence with an authenticated verification sequence that is stored in the data store. If both the biometric scan and the verification sequence match, an authentication module authenticates the user to the system. The user may enter the verification sequence by linearly or angularly displacing his finger on the biometric reader.

18 Claims, 6 Drawing Sheets

APPARATUS, SYSTEM, AND METHOD FOR SEQUENCED BIOMETRIC AUTHENTICATION

BACKGROUND

1. Field of the Invention

This invention relates to the field of biometric authentication, and more particularly relates to validating both a biometric identifier and an associated code.

2. Description of the Related Art

Security is increasingly important in today's world. One result of this has been an increase in the use of biometric scanning as a way to authenticate people trying to access secure locations or trying to access secure information. For example, many computers have built-in fingerprint readers to authenticate users. Certain buildings use facial recognition readers, palm readers, retinal readers, or others to ensure that only authorized personnel can access secure locations.

While biometric authentication offers a number of advantages, it is only a single layer of security. If a hacker gets a fingerprint, for example, of an authorized user, the hacker may be able to gain access to the secured information. For example, if oil or residue leaves a fingerprint on the fingerprint reader, a hacker might place a piece of white paper over the fingerprint reader. In certain systems, this spoofs the system into reading the fingerprint residue and allows the hacker access.

BRIEF SUMMARY

The present invention has been developed in response to the present state of the art, and in particular, in response to the problems and needs in the art that have not yet been fully solved by currently available biometric authentication systems. Accordingly, the present invention has been developed to provide an apparatus, system, and method for strong biometric authentication that overcome many or all of the above-discussed shortcomings in the art.

In one embodiment, the apparatus includes an input module that receives a biometric scan and a verification sequence entered by a user through a biometric reader. The biometric scan and the verification may be received separately or simultaneously; for example, the biometric scan may be derived from the verification sequence or while the verification sequence is entered. The verification sequence may include a set of biometric scans at multiple angles, or may include a set of symbols entered using the biometric reader.

A matching module validates the user entering the biometric scan. In one embodiment, validation includes comparing the biometric scan with one or more authenticated biometric scans stored in a data store and validating the biometric scan if the biometric scan matches at least one authenticated biometric scan. Validation may further include comparing the verification sequence with an authenticated verification sequence stored in the data store and validating the verification sequence if the verification sequence matches the authenticated verification sequence.

In one embodiment, the apparatus includes an authentication module that authenticates the user to a system if the matching module validates the verification sequence against the authenticated verification sequence, and if the matching module validates the biometric scan against the authenticated biometric scan. In another embodiment, the biometric scan is a fingerprint and the biometric reader is a fingerprint reader that measures displacement of a finger on the biometric reader in addition to reading a fingerprint. The biometric reader may be an area fingerprint reader or may also be a swipe fingerprint reader. In one embodiment, the user enters the verification sequence by displacing her finger on the biometric reader. Displacement may be angular displacement of the finger from a neutral position on the biometric reader, or may be linear displacement of the finger from a neutral position on the biometric reader.

The apparatus may also include a feedback module that associates symbols with various angular displacements. In such an embodiment, the verification sequence may comprise a set of symbols entered by the user through angular displacement. Similarly, the feedback module may associate symbols with various linear displacements, and the verification sequence may include a set of symbols entered by the user through linear displacement. In certain embodiments, the feedback module inserts a symbol associated with a particular displacement into the verification sequence if there is a change in direction of displacement or if a time interval completes with no change in the direction of displacement.

In one embodiment, the input module receives a verification sequence including biometric scans at variable angular displacements entered by a user using an area biometric reader. The matching module validates the verification sequence against an authenticated verification sequence that includes biometric scans at variable angular displacements for an authorized user. The validation may include comparing each biometric scan and its angular displacement in the verification sequence with a corresponding biometric scan and its angular displacement in the authenticated verification sequence, and determining that the verification sequence matches the authenticated verification sequence if each biometric scan and its angular displacement in the verification sequence matches each biometric scan and its angular displacement in the authenticated verification sequence. The authentication module authenticates the user if the matching module validates the verification sequence of biometric scans against the authenticated verification sequence of biometric scans.

Validating the verification sequence may also include determining that the number of biometric scans in the verification sequence is equal to the number of biometric scans in the authenticated verification sequence. The authenticated verification sequence may be a set of distinct fingerprint images, or may also be a single fingerprint image and a set of angular displacements for that fingerprint image.

A system of the present invention is also disclosed. The system includes a biometric reader that obtains a biometric scan and a verification sequence entered by a user, and may also include an input module, matching module, and authentication module as described above. The system may also include a monitor and/or speakers for providing audio and/or visual feedback to the user. In certain embodiments, the feedback module provides audio and/or visual feedback using the monitor and speakers.

Also disclosed is a method for authenticating a user using a biometric reader. In one embodiment, the method includes receiving a biometric scan and a verification sequence entered by a user through a biometric reader, comparing the biometric scan with authenticated biometric scans stored in a data store, and validating the biometric scan if the biometric scan matches the authenticated biometric scan. The method may also include comparing the verification sequence with an authenticated verification sequence stored in the data store and validating the verification sequence if the verification sequence matches the authenticated verification sequence. The method may further include authenticating the user to a system if the verification sequence is validated against the authenticated verification sequence, and if the biometric scan is validated against the authenticated biometric scan.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered limiting of the invention's scope, the invention will be described and explained with additional specificity and detail through the use of the accompanying drawings, in which.

DETAILED DESCRIPTION

Figure 1A:
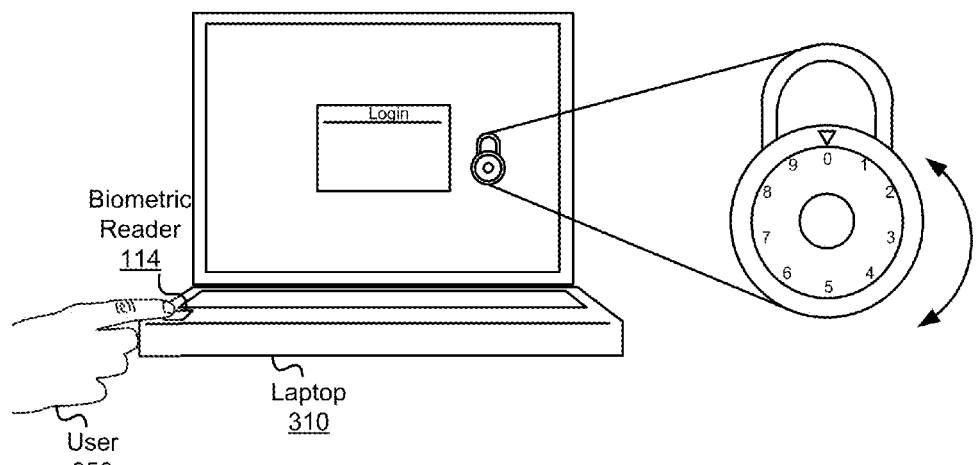
FIG. 1a is an illustration of one embodiment of a user utilizing a system for multi-factor biometric authentication.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

A computer readable medium may be any tangible medium capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

An apparatus can be any piece of machinery, device, or tool that performs the functions described in connection with the apparatus. In certain embodiments, the apparatus includes a processor that reads instructions from a computer readable medium. In certain embodiments, the apparatus includes hardware circuits for performing the specified functions. In certain embodiments, the apparatus includes a combination of hardware and instructions stored on a computer readable medium executable by a processor.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1a depicts an illustration of a user 350 using a laptop 310 that has a validation apparatus 120 as described below. The user 350 enters biometric information (in this case, fingerprint) using the biometric reader 114. The biometric reader 114 authenticates the user 350 using the biometric information. In addition, the user 350 enters a verification sequences using the biometric reader 114. In one embodiment, the sequence is a series of numbers.

For example, as the user 350 moves his finger on the biometric reader 114, the laptop 310 may cause the graphic of the lock to spin. This allows the user 350 to enter a numerical sequence as the verification sequence. If the biometric information is validated against an authenticated biometric scan, and the verification sequence is validated against an authenticated verification sequence, the user 350 is authorized and given access to data on the laptop 310. As a result, the laptop 310 benefits from an additional layer of security in addition to simple biometric protection, but does not require additional hardware.

FIG. 1a is simply one example of a system using biometric information. Further embodiments are described below and in connection with other figures. The present invention is not limited to the embodiment depicted in FIG. 1a.

Figure 1B:
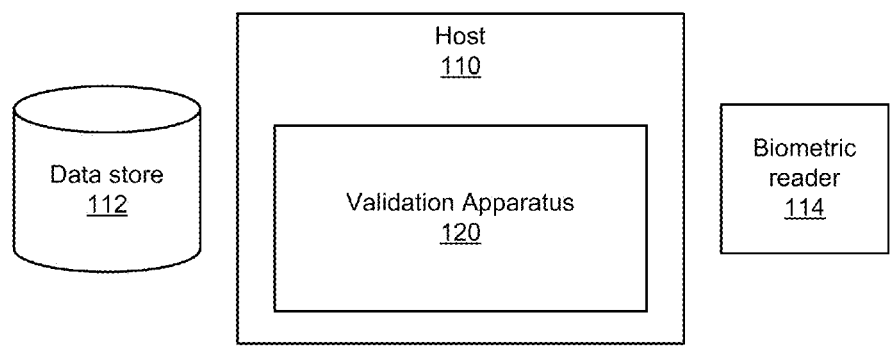
FIG. 1b is a schematic block diagram illustrating one embodiment of a system for multi-factor biometric authentication

FIG. 1b depicts a system for strong biometric authentication. The system includes a host 110, a data store 112, and a biometric reader 114. The host 110 may be any device for which authentication is needed. In one embodiment, the host 110 performs some action after authentication such as granting access to data, unlocking a door, or other action. In one embodiment, the host 110 is a computer such as a laptop, Personal Digital Assistant (PDA), cell phone, desktop, blade center, or other type of computing system. In one embodiment, the host 110 is a controller that controls a door or gate to a secure area that is restricted to authorized personnel. Authentication may be required in a variety of contexts, and host 110 is not limited to any particular situation.

The data store 112 stores biometric authentication information. The data store 112 may be any medium, memory device, or data structure capable of storing data. A data store 112 may be a flat file, a database, an object, or other construct capable of storing data. In certain embodiments, the data store 112 is incorporated into the host 110. The data store 112 may also be separate from the host 110. In one embodiment, the data store 112 stores biometric and sequence information and can retrieve biometric information stored in the data store 112. The data store 112 may also be a matching database with variable length fields to allow storing entries (such as the authenticated verification sequences described below) of variable lengths.

The data store 112 may also include other information related to an authorized user such as a name, an identification number, photograph, a computer account number, or other information that may be used to identify a user and allow desired access. The biometric and sequence information may be correlated to a name, identification number, etc. for a user.

The biometric reader 114 scans one or more biometrics of a user to obtain a biometric scan for the user. Many different biometrics, such as a fingerprint or a retinal image, can be used to uniquely identify an individual. The biometric reader 114 may be a fingerprint reader, a retinal reader, a facial recognition reader, a palm reader, or other type of reader that captures a biometric scan of a user. Similarly, the biometric scan may be a scan of a fingerprint, an image of an eye, or other biometric identifier. Technology used to capture the biometric information may be Optical imaging, Thermal imaging, Electric field or wave, or any other technology that converts the distinctive biometric pattern into a digital or analog representation readable by a computing device. The biometric scan may be stored as a visual image, or may be stored as non-visual data derived from the particular biometric and which can be used to recognize the particular biometric pattern. In one embodiment, a biometric scan may be a bitmap file, pixmap file, a JPEG file, a minutae template file, or other known in the art.

The host 110 includes a validation apparatus 120. The validation apparatus 120 authenticates a user to the host 110 based on information entered at the biometric reader 114. The validation apparatus 120 verifies that the biometric scan is legitimate and authorized, and also verifies the verification sequence entered by the user via the biometric reader 114. The validation apparatus 120 increases the security of the host 110 by using multi-factor authentication to authenticate the user to the host 110. In one embodiment, the multiple factors are entered using the biometric reader 114, eliminating the need for additional hardware.

Figure 2:
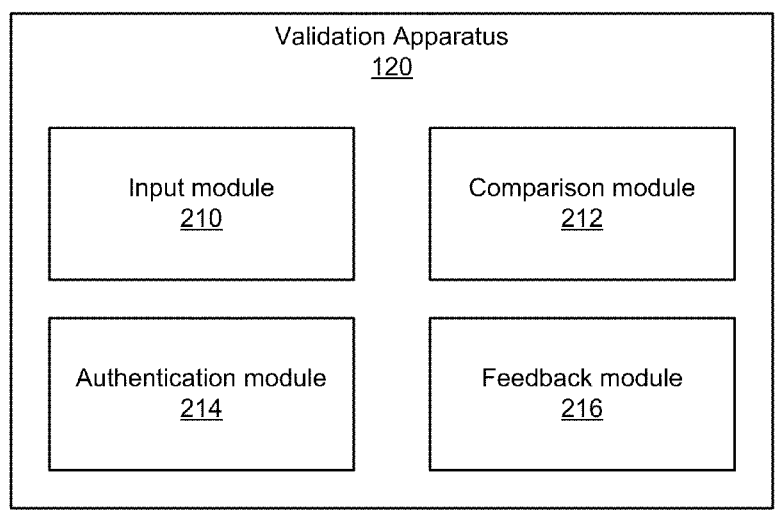
FIG. 2 is a schematic block diagram illustrating one embodiment of an authentication apparatus.

FIG. 2 is an illustrative block diagram of one embodiment of a validation apparatus 120. The validation apparatus 120 includes an input module 210, a matching module 212, and an authentication module 214. The input module 210 receives a biometric scan and a verification sequence entered by a user through the biometric reader 114. The biometric scan may be a scan of a fingerprint, a hand, face, or other biometric identifier. In one embodiment, the verification sequence is a set of biometric scans at multiple angles. For example, the verification sequence may be a set of four fingerprint scans with the finger oriented at 45° for the first scan, 0° for the second scan, 90° for the third scan, and −22.5° for the fourth scan. In one embodiment, the verification sequence is a set of symbols entered using the biometric reader. For example, the verification sequence may be an alpha-numeric code or symbolic code. Symbols may be numbers, letters, icons, sounds, or other representation.

In certain embodiments, the input module 210 receives the biometric scan and the verification sequence directly from the biometric reader 114. In other embodiments, the input module 210 receives the biometric scan and the verification sequence indirectly from the biometric reader 114. That is, other elements may receive and process the sequence prior to passing it to the input module 210.

In one embodiment, the biometric scan and the verification sequence are entered by the user separately through the biometric reader 114. For example, the input module 210 may receive a single biometric scan, such as a finger print, authenticate it and then may separately receive angular or linear sequence information, such as derived from subsequent fingerprint scans. In this embodiment, if the biometric scan is a fingerprint, the received fingerprint may be used to match a stored finger print and the received angle information may be used separately to verify a sequence.

The biometric scan and the verification sequence may, however, also be entered together such that the input module 210 derives the biometric scan from multiple verification sequences. For example, the verification sequence may be a series of fingerprints entered at multiple variable angles. In one embodiment, when the input module 210 receives the verification sequence, it is also receiving a biometric scan and re-authenticating each fingerprint presented at each unique angle or linear displacement. This provides a higher level of security and aids in minimizing fraud via attempts to defeat the biometric authentication process. Thus, in certain embodiments, the input module 210 receives the biometric scan and the verification sequence when the input module 210 receives a verification sequence that includes biometric scans. In the embodiments, the input module 210 does not need to receive the biometric scan and the verification sequence separately. In one embodiment, the user may simply be prompted to enter the verification sequence and the input module 210 derives the biometric scan from the entry of the verification sequence. For example, if the user uses the biometric reader 114 as a motion detector to enter a verification sequence, the input module 210 may derive a fingerprint while the user enters the verification sequence.

In certain embodiments, the input module 210 receives the verification sequence one item at a time, as the user enters the verification sequence. For example, the input module 210 may receive each fingerprint or symbol as it is entered by the user at the biometric reader 114. In certain embodiments, the input module 210 receives the verification sequence at once after the user has entered the complete sequence at the biometric reader 114.

The matching module 212 validates the user entering the biometric scan and verification sequence. In one embodiment, the matching module 212 compares the biometric scan with an authenticated biometric scan stored in the data store 112. The authenticated biometric scan is a biometric scan of a known authorized user. For example, the data store 112 may hold fingerprint data (such as images, minutia files, etc) for all users who are authorized to have access to a particular system. The matching module 212 compares the fingerprint data the user currently enters at the biometric reader 114 with the authenticated fingerprint data the user initially enrolled that is stored in the data store 112. The matching module 212 validates the fingerprint data if it matches the authenticated fingerprint data.

The matching module 212 validates the biometric scan if the biometric scan matches the authenticated biometric scan. In one embodiment, the matching module 212 uses a fingerprint searching and matching engine to compare biometric scans and determine whether or not there is a match. Where the biometric scans are fingerprints, the matching module 212 may use minutiae-based matching techniques or correlation-based matching techniques. The matching module 212 may use a variety of search and matching technologies to search and match biometric scans.

The matching module 212 also compares the verification sequence with an authenticated verification sequence stored in the data store 112. In one embodiment, the authenticated verification sequence is a set of symbols entered by a known authorized user. The authorized user may enter the authenticated verification sequence when the user is being enrolled as an authorized user for the particular system. In another embodiment, the authorized user enters the authorized verification sequence using a keyboard when the user initially enrolls their biometric information (stores their fingerprints in the database).

The matching module 212 validates the verification sequence if the verification sequence matches the authenticated verification sequence. In one embodiment, the matching module 212 requires an exact match prior to validating the verification sequence. For example, if the verification sequence is a numeric code such as 4-9-3 the matching module 212 may require that the user enter the numeric code precisely.

In other embodiments, the matching module 212 may require that the verification sequence be similar to the authenticated verification sequence and specify an error tolerance. For example, if the verification sequence is a set of fingerprints at varied angles, the matching module 212 may require that the fingerprint image provided by the user and the fingerprint image in the verification sequence be close, but not a precise match. In addition, if the verification sequence is a set of fingerprint images at varied angles, the matching module 212 may specify a tolerance of error in a particular angle. For example, the matching module 212 may consider a fingerprint scanned at an angle of between 40° and 50° to qualify as matching the angle of a fingerprint at 45°.

In one embodiment, validating the verification sequence also includes verifying that the number of biometric scans or symbols in the verification sequence entered by the user is the same as the number of biometric scans in the authenticated verification sequence. For example, if the user enters verification sequence is 4-6-8-9, but the authenticated verification sequence is 4-6-8, the matching module 212 may determine that the verification sequence is invalid even though it contains the correct authenticated verification sequence as a subset.

In one embodiment, the matching module 212 validates the biometric data received by the input module 210 separately from validating the sequence information received by the input module 210. For example, the matching module 212 may compare a fingerprint to a known fingerprint of a user as stored on a smart card, employee ID badge, or other portable medium capable of storing a finger print template or may find a fingerprint that matches a stored fingerprint in a large database of enrolled finger print templates. The matching module 212 may then validate the received sequence by matching a stored sequence associated with the user for which a matching fingerprint was found.

In another example, the matching module 212 validates the biometric data received by the input module 210 along with validating the sequence information received by the input module 210. For example, if the input module 210 receives fingerprint information at various angles, the matching module 212 could use one or more of the received fingerprints to match a stored fingerprint of an authorized user. The matching module 212 could simultaneously match an angle of each received fingerprint with multiple stored fingerprints at all possible angles of input for the user. The matching module 212 could match a single fingerprint from a set of received fingerprints and derive possible angles through calculation or could match each received fingerprint with stored templates of all possible angles.

An authentication module 214 authenticates the user to the secure system, such as the host 110, if the matching module 212 validates the verification sequence against the authenticated verification sequence and the biometric scan against the authenticated biometric scan. For example, when the authentication module 214 authenticates the user, the user may be granted access to a restricted area, a computer, a file, or other secure location or information.

In one embodiment, a feedback module 216 provides the user with feedback to facilitate entering the verification sequence. For example, the feedback module 216 may provide a graphic or audio to help the user enter the verification sequence. The feedback module 216 may also instruct the biometric reader 114 to act as a motion or displacement detector that allows the user to enter symbols for the verification symbol as described in greater detail below. The feedback module 216 may also interpret the data provided by the biometric reader 114 and associate symbols with the motion detected by the biometric reader 114.

In one embodiment, the input module 210, matching module 212, authentication module 214, and feedback module 216 are implemented at the device driver level of a computer system. In other embodiments, the validation apparatus 120 may be part of an operating system. The validation apparatus 120 may also be incorporated into the biometric reader 114 itself as firmware or microcode, or implemented as an end user application software. All or a portion of the modules 210, 212, 214, 216 may be in separate devices and/or locations. For example, the input module 210 may be collocated with a biometric reader 114 while the matching module 212, authentication module 214, and feedback module 216 may reside at a host 110. One of skill in the art will recognize other ways to organize the modules 210, 212, 214, 216.

Figure 3A:
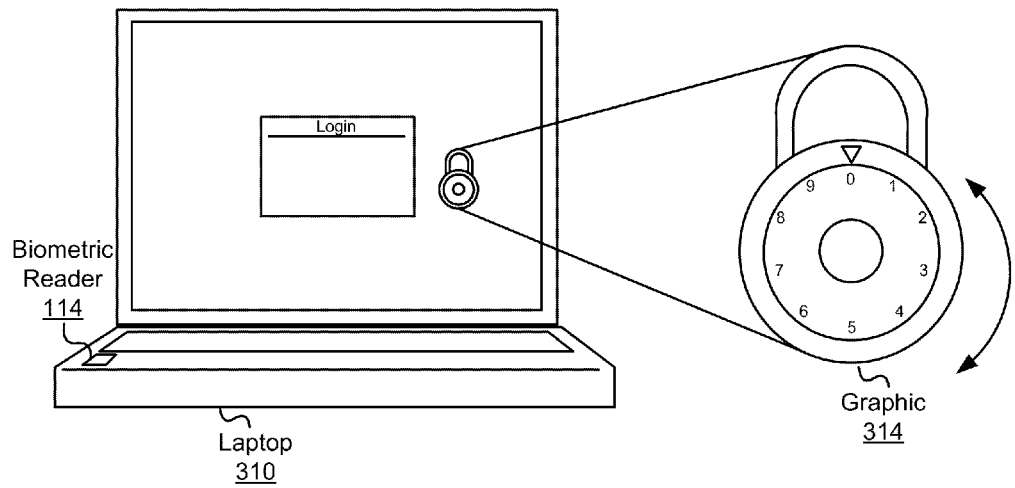
FIG. 3 is a schematic block diagram illustrating two embodiments of a system presenting a graphic in support of multi-factor biometric authentication.
Figure 3B:
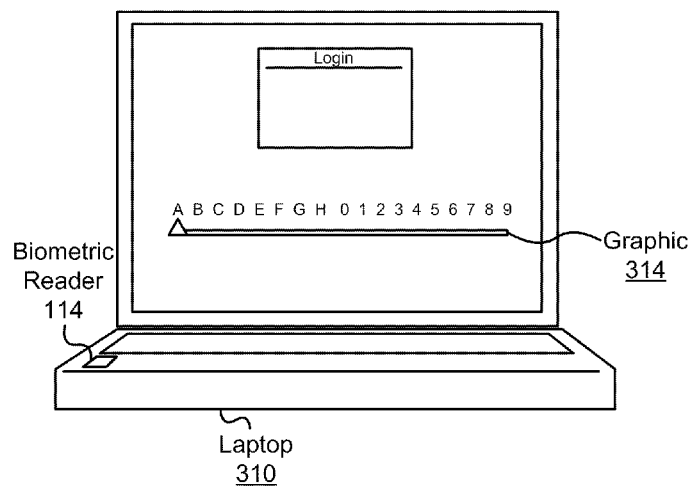

FIGS. 3a and 3b show embodiments of a laptop 310 with a biometric reader 114 that displays a graphic 314 to facilitate multi-factor biometric authentication. FIG. 3a shows the laptop 310 displaying a login screen that includes a graphic 314 of a lock. As shown in FIGS. 3a and 3b, a system (whether or not it is a laptop 310) may be equipped with a monitor for providing visual information and speakers for providing audio feedback to the user. In such embodiments, the feedback module 216 may provide visual feedback, audio feedback, or both, to the user.

In one embodiment, the graphic 314 is an image of a common padlock type lock that responds with animated graphics as the user enters the biometric scan and verification sequence using the biometric reader 114. In one embodiment, the user first presents a biometric scan. When the biometric scan is authenticated, the feedback module 216 instructs the biometric reader 114 to operate in a displacement detection mode and the user is instructed to enter the verification sequence. In other embodiments, the biometric scan is derived directly as the user enters the verification sequence using the biometric reader 114.

In one embodiment, the user uses the biometric reader 114 to spin the numbers on the lock graphic 314. The user may enter a verification sequence that is a numeric code using the lock, following which the numeric code is compared against an authenticated verification sequence that is a numeric code. In one embodiment, the biometric reader 114 is configured to act as a motion detector. For example, a swipe fingerprint reader may be set up to measure the linear displacement of a finger on the biometric reader. As the user linearly displaces his finger from a neutral position on the biometric reader 114, the feedback module 216 alters the graphic 314 incrementally to show the dial on the lock spinning. In one embodiment, the biometric reader 114 is an area fingerprint reader which is set up to measure angular displacement of a finger on the biometric reader. As the user angularly displaces his finger from a neutral position on the biometric reader 114, the graphic 314 shows the dial on the lock spinning. In certain embodiments, audio feedback, such as clicking or audio number callouts, may provide additional feedback to help the user naturally spin the lock using the biometric reader 114.

In certain embodiments, the feedback module 216 associates symbols with various angular displacements or various linear displacements. The feedback module 216 may determine that the user intends to enter a particular number if he pauses at a particular number for a predetermined period of time. In other embodiments, like a regular padlock, the feedback module 216 determines that the user intends to enter a particular number when the user reverses the direction of her motion. Thus, the feedback module 216 may insert a symbol that is associated with a particular displacement into the verification sequence if the user changes the direction of the displacement or if some predetermined time interval completes during which time there was no change in the direction of displacement.

FIG. 3b shows a second exemplary embodiment of a graphic 314 that may be used to enter symbols into the verification sequence. As the user alters the displacement of the particular biometric on the biometric reader 114, the feedback module 216 may cause the pointer to move across the line below the numbers and letters. The user can thus control the pointer and use the biometric reader 114 to enter the required verification sequence.

Figure 4A:
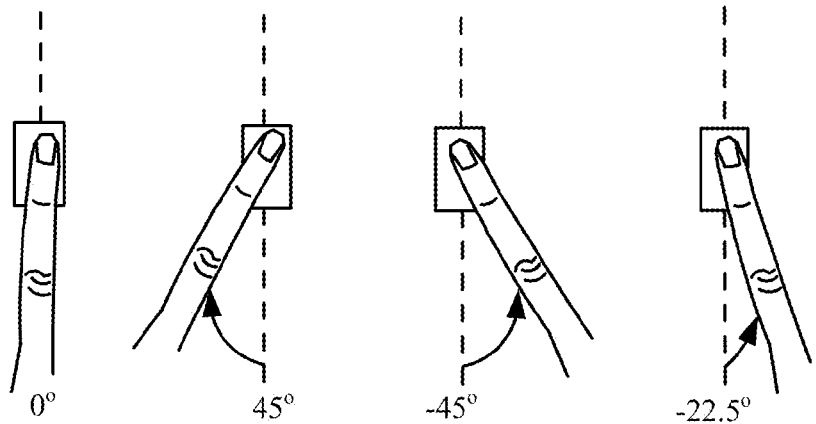
FIG. 4a is a schematic diagram illustrating one embodiment of a user entering a verification sequence.

FIG. 4a shows one embodiment of a user entering a verification sequence that includes a set of biometric scans at multiple angles. In the depicted embodiment, the biometric scans are fingerprints; however, the biometric scans could be other types of biometric scans as noted above. In one embodiment, the user enters a first biometric scan at 0°, which is then validated as described above. In one embodiment, the user is prompted to enter the verification sequence only after the 0° scan is validated. In other embodiments, the user simply enters the first biometric scan of the verification sequence at the preset angle, and authentication of the biometric scan occurs based on that entry.

Prior to using the validation apparatus 120 to gain access to the system, the user or an administrator typically sets up an account for the user in the system by a process commonly known as enrollment. In typical embodiments, this includes getting an authenticated biometric scan from the user and getting an authenticated verification sequence. Where the verification sequence is a set of biometric scans at multiple angles, as shown in FIG. 4a, the user may enter the verification sequence by scanning his finger a number of times as shown to establish the verification sequence. In other embodiments, the user may enter an authenticated biometric scan and then simply enter the angles in the authorized verification sequence using a keypad.

In one embodiment, the data store 112 stores a single authenticated biometric scan and the angles of the authenticated verification sequence, as shown in authenticated verification sequence 410a. In such an embodiment, comparing the verification sequence with the authenticated verification sequence may entail rotating the authenticated biometric scan by the specified angle and comparing the rotated biometric scan with the particular entry in the verification sequence as entered by the user.

In other embodiments, the data store 112 stores unique biometric scans for each entry in the verification sequence, as shown in authenticated verification sequence 410a. In such an embodiment, comparing the verification sequence with the authenticated verification sequence may entail comparing each biometric scan in the verification sequence against a corresponding biometric scan in the authenticated verification sequence 410a. Thus, the first entry in the verification sequence is compared with the first entry in the authenticated verification sequence, and so on until each element of the verification sequence is compared and validated.

In one embodiment, when the user enters the first biometric scan (regardless of whether or not the first biometric scan is part of the verification sequence) the validation apparatus 120 finds an entry within the data store 112 with a matching authenticated biometric scan. If no match is found, the user is denied access. If a match is found, the user must still enter the verification sequence correctly; however, subsequent entries are compared only against those entries in the verification sequence. As a result, the data store 112 does not need to be searched completely for each entry in the verification sequence.

The validation apparatus 120 may thus record multiple presses of the same fingerprint in different geometric orientations, which is used as a unique code in the enrollment and authentication process. The system is enhanced with a second layer of security, but does not require additional hardware to get the additional security layer.

Figure 4B:
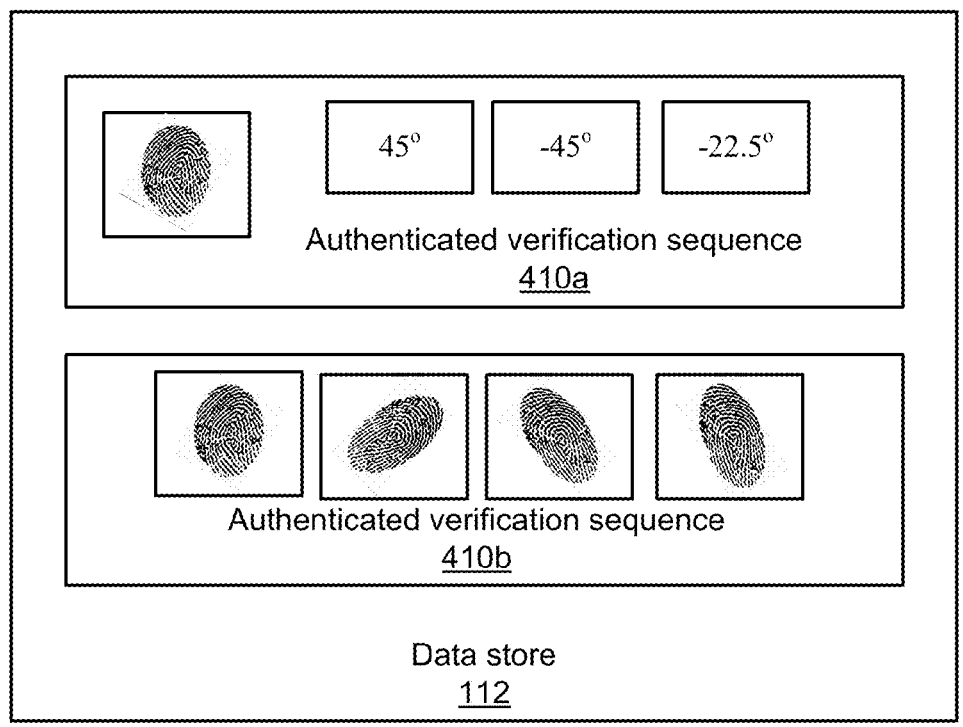
FIG. 4b is a schematic block diagram illustrating one embodiment of a data store storing authenticated verification sequences.

While FIG. 4b shows the data store 112 images of fingerprints in the data store 112, the representation is for ease of understanding. The biometric scans may be images, minutiae files, or other representations of biometric scans known in the art. In addition, the biometric scans may be palm prints, retinal scans, facial recognition scans, or other varieties of biometric scans.

In an embodiment such as that associated with FIG. 4, the input module 210 receives a verification sequence that includes biometric scans at variable angular displacements entered by the user using an area biometric reader 114. The matching module 212 may then validate the verification sequence against an authenticated verification sequence (such as that shown in 410a or 410b) of an authorized user that is made up of a plurality of biometric scans at variable angular displacements.

In one embodiment, the matching module 212 compares each biometric scan and its angular displacement in the verification sequence with a corresponding biometric scan and its angular displacement in the authenticated verification sequence, whether in the form shown in 410a or 410b. The matching module 212 may determine that the verification sequence matches the authorized verification sequence if each biometric scan, and its angular displacement, matches each biometric scan and associated angular displacement in the authenticated verification sequence 410b. The authentication module then authenticates the user if the matching module 212 validates the verification sequence against the authenticated verification sequence.

Figure 5A:
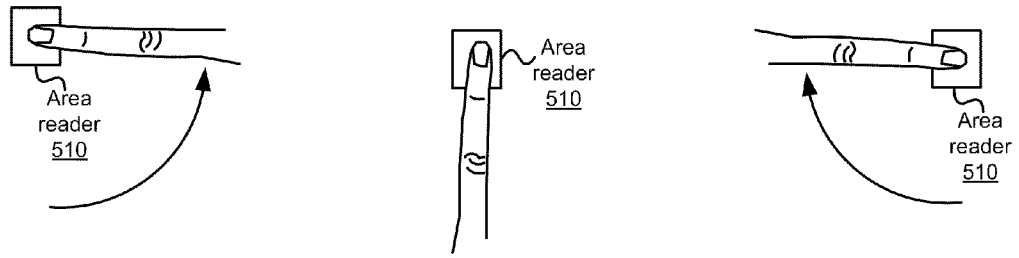
FIG. 5 is a schematic diagram illustrating different embodiments of approaches to entering a verification sequence using biometric readers.
Figure 5B:
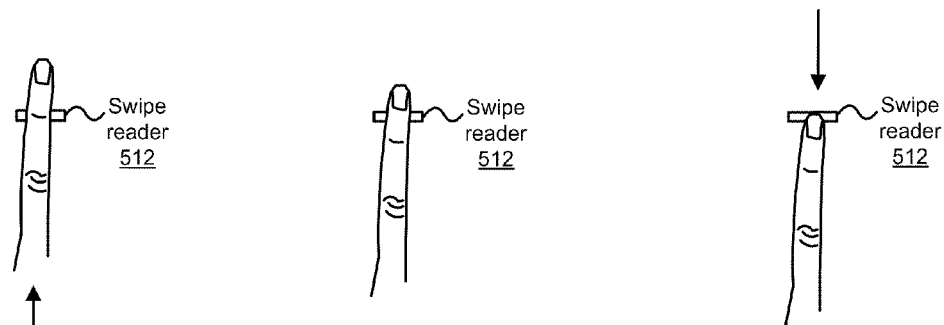
Figure 5C:
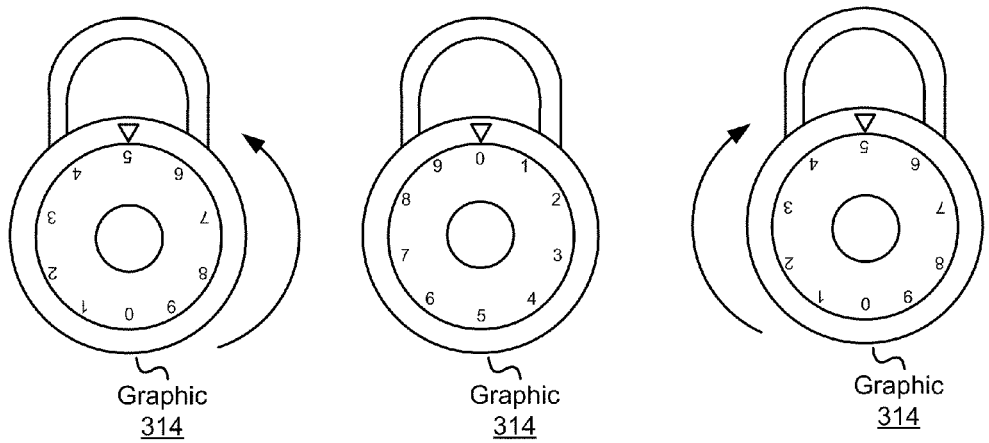

FIG. 5 shows one embodiment of a user entering a verification sequence that includes a set of symbols using a biometric reader. FIG. 5a shows a user entering symbols using an area fingerprint reader 510. In the depicted embodiment, the area fingerprint reader 510 detects angular displacement of the finger from a neutral position, such as the 0° position shown in the middle figure of FIG. 5a. In one embodiment, as the user changes the angular displacement from the 0° position to a 90° position, as shown in the first figure of FIG. 5a, the dial on the graphic 314 moves 180° in a counter-clockwise direction. As the user changes the angular displacement from the 0° position to a −90° position, as shown in the third figure of FIG. 5a, the dial on the graphic 314 moves 180° in a clockwise direction. This allows the user to enter the full range of digits on the graphic 314 by changing the angle of the finger on the area fingerprint reader 510. The relationship between changes in angular displacement and corresponding changes in the symbols on the graphic 314 may, of course, vary from the example given above.

In another example, a user may rotate a finger clockwise to move the digits on the graphic 314 clockwise, return the finger to a neutral position to stop the graphic 314 from moving digits, and rotate the finger counter-clockwise direction to move the graphic 314 counter-clockwise. In a further example, an amount of angular displacement of the finger determines a speed at which the graphic 314 rotates digits so increasing angular displacement of the finger speeds up number movement and decreasing angular displacement causes rotation of digits in the graphic 314 to slow or stop.

FIG. 5b shows one embodiment of a user entering a verification sequence that includes a set of symbols using a biometric reader that is a swipe fingerprint reader 512. In one embodiment, as the user moves the finger up, as shown by the direction of the arrow in the first figure in FIG. 5b, the dial on the graphic 314 rotates counter-clockwise. Conversely, as the user moves the finger down, the dial on the graphic 314 rotates clockwise. The above relationship is merely one example of a possible implementation, and a variety of different implementations that match motion to changes in the graphics may be implemented.

Figure 6:
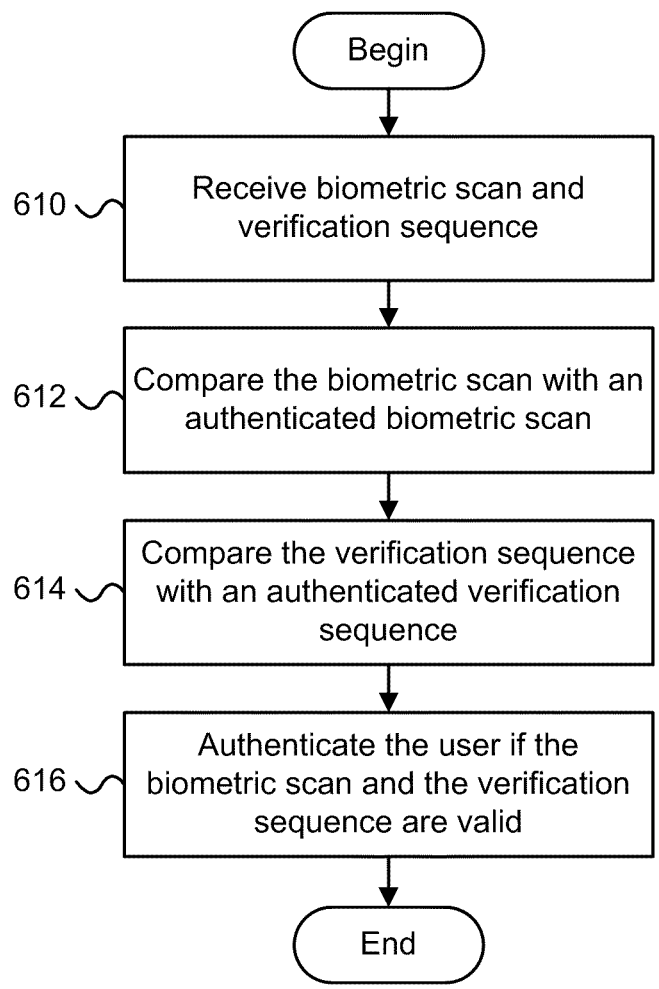
FIG. 6 is a schematic flow chart diagram illustrating one embodiment of a method for multi-factor authentication.

FIG. 6 is an illustration of one embodiment of a method 600 for authenticating a user using a biometric reader 114. In one embodiment, the method includes receiving 610 a biometric scan and a verification sequence entered by a user through a biometric reader 114. The verification sequence may be a set of biometric scans, or may alternatively be a set of symbols entered using the biometric reader 114. In one embodiment, the input module 210 receives the biometric scan and verification sequence.

The method also includes comparing 612 the biometric scan with an authenticated biometric scan. If the biometric scan matches the authenticated biometric scan, the biometric scan is validated. In one embodiment, the matching module 212 makes the comparison and validates the biometric scan.

The method also includes comparing 614 the verification sequence with an authenticated verification sequence stored in the data store. If the verification sequence matches the authenticated verification sequence, the verification sequence entered by the user is validated. In one embodiment, the matching module 212 makes the comparison and validates the verification sequence.

As noted above, the steps 612 and 614 may, in certain embodiments, be combined. For example, the biometric scan may be compared and authenticated in connection with comparing the verification sequence with an authenticated verification sequence. Regardless of whether the steps are separate or combined, both the biometric scan and the verification sequence are compared and validated such that a user entering a valid verification sequence but with a wrong biometric (such as a fingerprint) is not authenticated, nor is a user with a valid biometric but an incorrect verification sequence.

The method further includes authenticating 616 the user to the system if the biometric scan and the verification sequence are validated. In one embodiment, the authentication module 214 authenticates the user in response to the matching module 212 validating both the biometric scan and the verification sequence. After authentication, the user may be granted appropriate access to the system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for authenticating a user using a fingerprint reader, the apparatus comprising:

an input module, comprising a fingerprint reader, that receives at least one biometric scan and a verification sequence entered by a user through the fingerprint reader that reads one or more of fingerprint ridge minutiae and fingerprint ridge patterns, the biometric scan comprising a fingerprint, wherein the verification sequence comprises a set of symbols entered using the fingerprint reader, each symbol entered by the user through one of linear motion and angular motion on the fingerprint reader while a finger of the user moves while being in contact with the fingerprint reader, each symbol comprising one or more of a number, a letter, an icon, and a sound;

a feedback module that provides one or more of visual feedback and audio feedback to the user, the visual and audio feedback configured to allow the user to determine when the linear or angular motion corresponds to a symbol for selection, the visual feedback comprising an electronic display displaying the set of symbols and a visual indicator on the electronic display, wherein the linear or angular motion on the fingerprint reader moves one or more of the set of symbols with respect to the visual indicator and the visual indicator with respect to the set of symbols such that the visual feedback indicates when the linear motion or angular motion on the fingerprint reader corresponds to a symbol of the set of symbols for selection, the electronic display being a separate device from the fingerprint reader, the audio feedback comprising an audio signal that indicates when the linear motion or angular motion corresponds to each symbol of the set of symbols;

a matching module that validates the user entering the biometric scan, wherein validation comprises:

comparing one or more of fingerprint ridge minutiae and fingerprint ridge patterns of the at least one biometric scan with one or more of fingerprint ridge minutiae and fingerprint ridge patterns of one or more authenticated biometric scans stored in a data store, the authenticated biometric scans comprising a fingerprint, and validating the biometric scan in response to the biometric scan matching at least one authenticated biometric scan;

comparing the verification sequence entered by the user using the fingerprint reader with an authenticated verification sequence stored in the data store and validating the verification sequence in response to the verification sequence matching the authenticated verification sequence; and an authentication module that authenticates the user to a system in response to the matching module validating the verification sequence against the authenticated verification sequence and further in response to the matching module validating the biometric scan against the authenticated biometric scan.

2. The apparatus of claim 1, wherein the fingerprint reader is further configured to measure displacement of a finger on the fingerprint reader.

3. The apparatus of claim 2, wherein the fingerprint reader is one of an area fingerprint reader and a swipe fingerprint reader.

4. The apparatus of claim 3, wherein the user enters the verification sequence through displacement of a finger on the fingerprint reader, the displacement moving through the set of symbols to a particular symbol.

5. The apparatus of claim 4, wherein displacement is one of angular displacement of the finger from a neutral position on the fingerprint reader and linear displacement of the finger from the neutral position on the fingerprint reader.

6. The apparatus of claim 1, wherein the feedback module that inserts a symbol associated with a particular displacement into the verification sequence in response to one of a change in direction of displacement and a completion of an interval with no change in the direction of displacement.

7. The apparatus of claim 1, wherein the modules are implemented at the device driver level of a host computer.

8. An apparatus for authenticating a user using a sequence of biometric scans, the apparatus comprising:

an input module that receives a fingerprint scan and a verification sequence entered by a user through a fingerprint reader that reads one or more of fingerprint ridge minutiae and fingerprint ridge patterns, wherein the verification sequence comprises a set of symbols entered by the user through one of linear motion and angular motion on the fingerprint reader while a finger of the user moves while being in contact with the fingerprint reader, each symbol comprising one or more of a number, a letter, an icon, and a sound;

a feedback module that provides one or more of visual feedback on a display and audio feedback through a speaker to the user, the visual and audio feedback configured to allow the user to determine when the linear or angular motion corresponds to a symbol for selection, the visual feedback comprising an electronic display displaying the set of symbols and a visual indicator on the electronic display, wherein the linear or angular motion on the fingerprint reader moves one or more of the set of symbols with respect to the visual indicator and the visual indicator with respect to the set of symbols such that the visual feedback indicates when the linear motion or angular motion on the fingerprint reader corresponds to a symbol of the set of symbols for selection, the electronic display being a separate device from the fingerprint reader, the audio feedback comprising an audio signal that indicates when the linear motion or angular motion corresponds to each symbol of the set of symbols;

a matching module that validates the verification sequence against an authenticated verification sequence comprising a sequence of symbols, wherein validation comprises:

comparing one or more of fingerprint ridge minutiae and fingerprint ridge patterns of the fingerprint scan received by the input module from the user with one or more of fingerprint ridge minutiae and fingerprint ridge patterns of a stored fingerprint scan that is part of the authenticated verification sequence and comparing the set of symbols and associated sequence received by the input module from the user using the fingerprint reader with a stored set of symbols and associated sequence that are part of the authenticated verification sequence;

determining that the verification sequence matches the authenticated verification sequence in response to each fingerprint scan and the set of symbols and associated sequence matching the fingerprint scan and the set of symbols and associated sequence in the authenticated verification sequence; and an authentication module that authenticates the user in response to the matching module validating the verification sequence against the authenticated verification sequence.

9. The apparatus of claim 8, wherein validating the verification sequence further comprises determining that the number of symbols in the verification sequence is equal to the number of symbols in the authenticated verification sequence.

10. The apparatus of claim 8, wherein the fingerprint reader is one of an area fingerprint reader and a swipe fingerprint reader.

11. The apparatus of claim 8, wherein the symbols are numbers and the feedback module comprises a display of numbers on one or more of a display of
   a lock wherein one or more of linear and angular displacement on the biometric scanner causes numbers on the display of the lock to spin,
   a row of numbers wherein one or more of linear and angular displacement on the biometric scanner selects one or more a number in the display of the row of numbers, and
   numbers on a keypad wherein one or more of linear and angular displacement on the biometric scanner selects one or more numbers on the display of the keypad.

12. A system for authenticating a user using a fingerprint reader, the system comprising:
   a fingerprint reader that obtains a biometric scan and a verification sequence entered by a user, the biometric scan comprising a fingerprint, the fingerprint reader reading one or more of fingerprint ridge minutiae and fingerprint ridge patterns wherein the verification sequence comprises a set of symbols, each symbol entered by the user through one of linear motion and angular motion on the fingerprint reader while a finger of the user moves while being in contact with the fingerprint reader, each symbol comprising one or more of a number, a letter, an icon, and a sound;
   an input module that receives the biometric scan and the verification sequence entered by the user;
   a feedback module that provides one or more of visual feedback and audio feedback to the user, the visual and audio feedback configured to allow the user to determine when the linear or angular motion corresponds to a symbol for selection, the visual feedback comprising an electronic display displaying the set of symbols and a visual indicator on the electronic display, wherein the linear or angular motion on the fingerprint reader moves one or more of the set of symbols with respect to the visual indicator and the visual indicator with respect to the set of symbols such that the visual feedback indicates when the linear motion or angular motion corresponds to a symbol of the set of symbols, the electronic display being a separate device from the fingerprint reader, the audio feedback comprising an audio signal that indicates when the linear motion or angular motion corresponds to each symbol of the set of symbols;
   a matching module that validates the user entering the biometric scan, wherein validation comprises:
      comparing one or more of fingerprint ridge minutiae and fingerprint ridge patterns of the biometric scan with one or more of fingerprint ridge minutiae and fingerprint ridge patterns of one or more authenticated biometric scans stored in a data store, the one or more authenticated biometric scans comprising one or more fingerprints, and validating the biometric scan in response to the biometric scan matching the authenticated biometric scan;
      comparing the verification sequence entered by the user using the fingerprint reader with an authenticated verification sequence stored in the data store and validating the verification sequence in response to the verification sequence matching the authenticated verification sequence; and
   an authentication module that authenticates the user to a system in response to the matching module validating the verification sequence against the authenticated verification sequence and further in response to the matching module validating the biometric scan against the authenticated biometric scan.

13. The system of claim 12, wherein the electronic display comprises a monitor and the symbols are displayed on the monitor.

14. The system of claim 12, wherein the electronic display comprises a monitor for providing visual feedback and the system comprises one or more speakers for providing the audio feedback.

15. A method for authenticating a user using a fingerprint reader, the method comprising:
   receiving a biometric scan and a verification sequence entered by a user through a fingerprint reader, the fingerprint reader reading one or more of fingerprint ridge minutiae and fingerprint ridge patterns, the biometric scan comprising a fingerprint, wherein the verification sequence comprises a set of symbols entered using the fingerprint reader, each symbol entered by the user through one of linear motion and angular motion on the fingerprint reader while a finger of the user moves while being in contact with the fingerprint reader, each symbol comprising one or more of a number, a letter, an icon, and a sound;
   providing one or more of visual feedback and audio feedback to the user, the visual and audio feedback configured to allow the user to determine when the linear or angular motion corresponds to a symbol for selection, the visual feedback comprising an electronic display displaying the set of symbols and a visual indicator on the electronic display, wherein the linear or angular motion on the fingerprint reader moves one or more of the set of symbols with respect to the visual indicator and the visual indicator with respect to the set of symbols such that the visual feedback indicates when the linear motion or angular motion corresponds to a symbol of the set of symbols, the electronic display being a separate device from the fingerprint reader, the audio feedback comprising an audio signal that indicates when the linear motion or angular motion corresponds to each symbol of the set of symbols;
   comparing one or more of fingerprint ridge minutiae and fingerprint ridge patterns of the biometric scan with one or more of fingerprint ridge minutiae and fingerprint ridge patterns of one or more authenticated biometric scans stored in a data store, the authenticated biometric scans comprising a fingerprint;
   validating the biometric scan in response to the biometric scan matching an authenticated biometric scan;
   comparing the verification sequence entered by the user using the fingerprint reader with an authenticated verification sequence stored in the data store;
   validating the verification sequence in response to the verification sequence matching the authenticated verification sequence; and
   authenticating the user to a system in response to validating the verification sequence against the authenticated verification sequence, and further in response to validating the biometric scan against the authenticated biometric scan.

16. The method of claim 15, wherein the user enters the verification sequence through displacement of a finger on the fingerprint reader, the displacement moving through the set of symbols to a particular symbol.

17. The method of claim 15, wherein displacement is one of angular displacement of the finger from a neutral position on the fingerprint reader and linear displacement of the finger from the neutral position on the fingerprint reader.

18. The apparatus of claim 1, wherein the symbols are numbers and the feedback module comprises a display of numbers on a lock and wherein one or more of linear and angular displacement on the biometric scanner causes numbers on the display of the lock to rotate.

* * * * *